United States Patent [19]
Lake

[11] 4,302,415
[45] Nov. 24, 1981

[54] METHOD OF FORMING FOAM ARTICLES FROM A FOAM THERMOPLASTIC WEB

[75] Inventor: Connie Lake, Tinley Park, Ill.

[73] Assignee: Creative Industries, Inc., Bridgeview, Ill.

[21] Appl. No.: 30,313

[22] Filed: Apr. 16, 1979

[51] Int. Cl.³ .................... B29D 27/00; B29C 17/04; B26F 3/08

[52] U.S. Cl. .................. 264/138; 264/554; 264/321; 425/298; 425/302.1; 425/306; 425/388; 425/817 R

[58] Field of Search ............ 264/321, 138, 145, 153, 264/554; 425/388, 298, 302.1, 306, 817 R

[56] References Cited

U.S. PATENT DOCUMENTS

| | | |
|---|---|---|
| 2,589,022 | 3/1952 | Page et al. .................... 264/153 |
| 2,797,179 | 6/1957 | Reynolds et al. . |
| 3,327,344 | 6/1967 | O'Brien et al. ............. 425/302.1 X |
| 3,338,997 | 8/1967 | Tigner ........................ 264/321 X |
| 3,348,265 | 10/1967 | King et al. . |
| 3,461,761 | 8/1969 | Mojonnier . |
| 3,475,526 | 10/1969 | Seto ............................ 264/321 X |
| 3,518,334 | 6/1970 | Carrigan et al. ............. 264/321 X |
| 3,523,474 | 8/1970 | Winslow et al. ............. 264/153 X |
| 3,640,666 | 2/1972 | Jope et al. ................... 264/153 X |
| 3,647,335 | 3/1972 | Brown ........................ 425/302.1 X |
| 3,676,537 | 7/1972 | Winstead . |
| 3,764,051 | 10/1973 | Pinto et al. .................. 425/388 X |
| 3,771,938 | 11/1973 | Pinto et al. .................. 425/388 X |
| 3,789,095 | 1/1974 | Winstead .................... 264/321 X |
| 3,923,948 | 12/1975 | Jackson et al. . |

Primary Examiner—Philip Anderson
Attorney, Agent, or Firm—Hill, Van Santen, Steadman, Chiara & Simpson

[57] ABSTRACT

A web of thermoplastic foam material is carried through an oven by an intermittently traveling conveyor engaging or gripping opposite sides of the web. The heated web is successively advanced by the conveyor between cooled heat-absorbing forming molds, which are moved toward each other to form the foam article and away from each other to release the article. A heat trimmer melts or vaporizes the leading and trailing ends of the foam material as compressed and formed by the molds, to form the marginal leading and trailing ends of the articles to the required peripheral form determined by the leading and trailing ends or edges of the molds and to separate the leading and trailing ends of the article from the web. The cooled molds, which may be made of a heat-conducting metal, such as aluminum, absorb the heat of melting as they pressurize the material along its edges and thereby determine the leading and trailing margins of the article. The web, as advanced from the molds, is then trimmed along the side margins of the article which are preferably straight, by straight dies which sever the article from the web. The severed articles are then stacked with the leading article on top and the trailing articles stacked thereabove. Two or more articles may be simultaneously formed in side-by-side relation and stacked in this relation.

9 Claims, 8 Drawing Figures

METHOD OF FORMING FOAM ARTICLES FROM A FOAM THERMOPLASTIC WEB

BACKGROUND, SUMMARY AND ADVANTAGES OF INVENTION

Foam articles, such as trays, egg cartons and the like have been formed from continuous web stock, heated to a forming temperature and formed or molded by forming molds movable toward and from each other, and have been trimmed along the sides and leading and trailing edges of the article after forming, to separate the article from the web.

When the articles are so formed, they are subjected to the deformation stresses of the heated web still in the oven as soon as the molds open. This normally takes the form of a bowed or deformed shape of the trailing edge of the article. In order to overcome this deformation stress, the articles must remain in the molds until they are cool enough to withstand this stress without deforming. This then determines the speed at which an article can be made when all other factors in the forming system are equal.

To avoid deformation of the article at higher speeds, the article has been peripherally cut from the web to define the margin of the article, and spaced retention tabs have been used to retain the article to the web.

These tabs must then be cut or broken off to free the article from the web, leaving unsightly edges which many times are trimmed or smoothed by a separate trimming operation. The article frequently prematurely separates from the web either in the forming station or between the forming station and a subsequent trimming station for the tabs. In addition, this method has proven to be so troublesome in keeping the dies cutting that it is not considered a viable production operation. One additional fault is the limitation of only one row of articles which can be successfully formed and trimmed.

By the present invention, I avoid the deformation of the article by the stress of the web still in the oven when the molds open by heat-trimming the leading and trailing ends of the web by melting or vaporizing the web, and terminating the trimming operation by the cooled molds as they form and pressurize the edges of the article, to define the leading and trailing margins of the web. The article is then retained to the web along its sides and is advanced to a trimming station, and trimmed from the web by shearing the straight or regular sides of the article from the web.

An advantage of the present invention is that foam articles such as meat trays, egg cartons and food carry-out containers may be formed at much higher speeds without deformation of the article.

Another advantage is the superior trim accuracy of the articles formed and trimmed, and the front and rear will be exactly alike due to the fact that the mold determines the trim line.

Still another advantage is that the same side trim tools may be used for different products.

A further advantage of the invention is that the difficulty in aligning articles in the trim press for final trimming is avoided by heat-trimming the front and rear of the articles during forming and then trimming the sides of the articles and separating the articles from the web in the trim press by straight trim dies.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
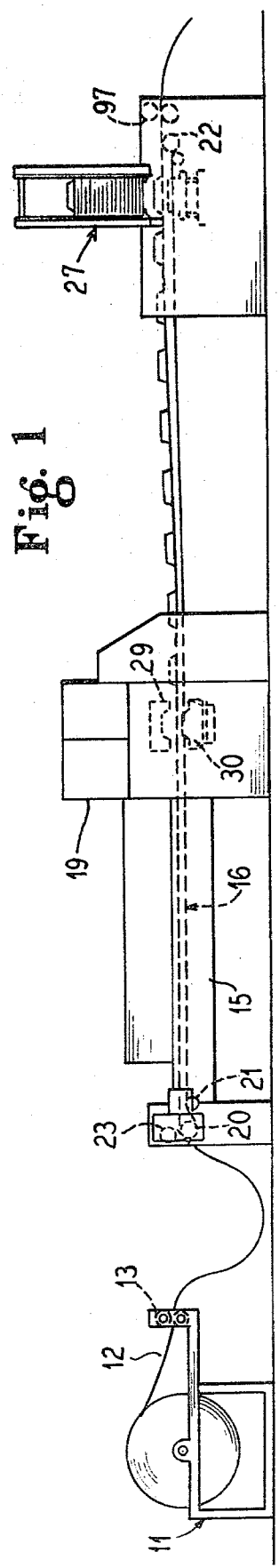
FIG. 1 is a schematic view in side elevation generally illustrating an apparatus and process for carrying out the principles of the present invention.

In the embodiment of the invention illustrated in the drawings, I have schematically shown in FIG. 1 an apparatus for carrying out the system of the present invention.

The apparatus generally includes a reel 11 for rotatably supporting a rolled web of thermoplastic foam material, indicated by reference numeral 12. The foam material may be a polystyrene foam web and may be trained in a nip between a pair of pinch rolls 13 to an oven 15.

Figure 6:
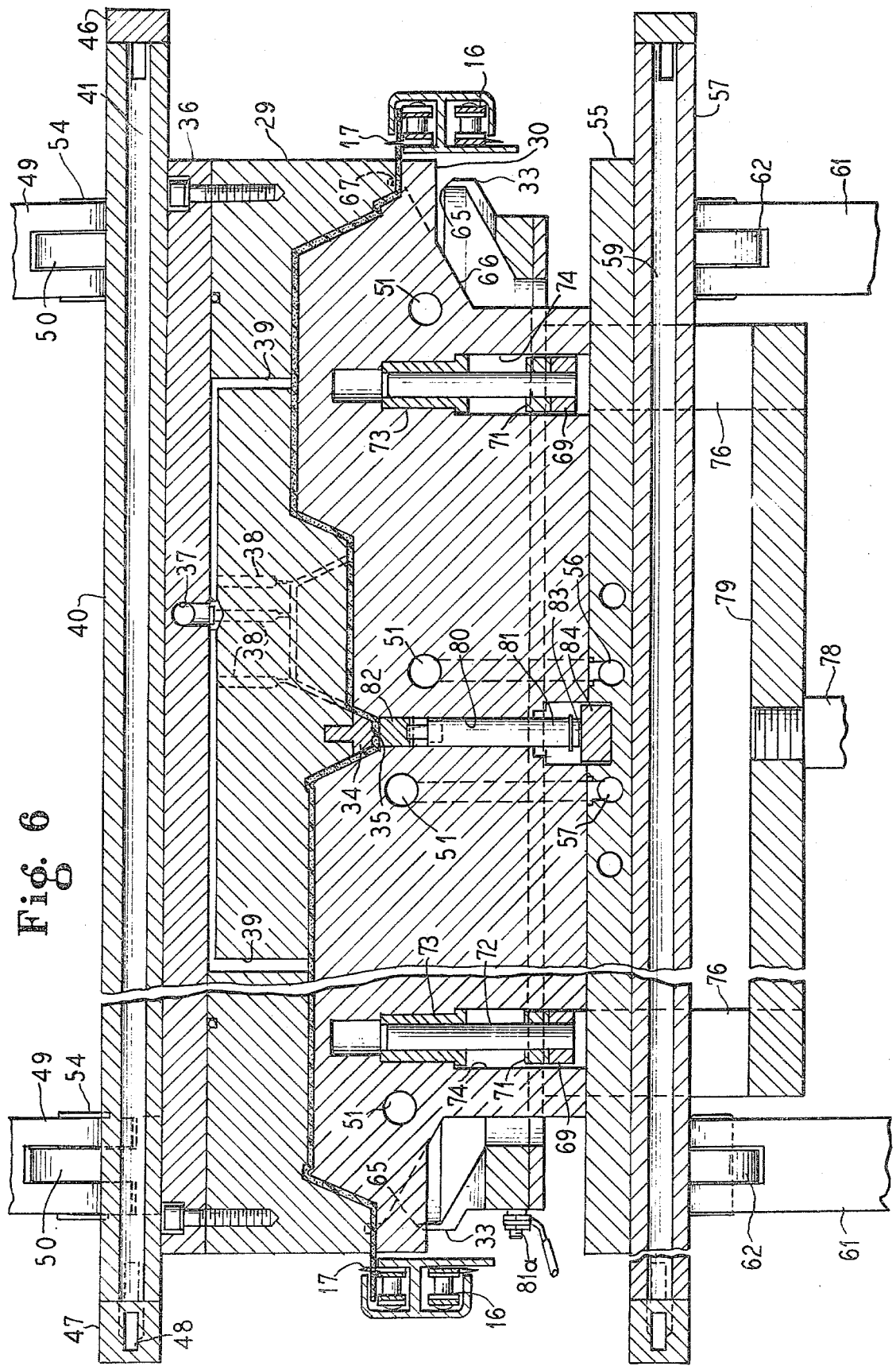
FIG. 6 is a fragmentary transverse sectional view taken through the apparatus, and showing the heat-trimmers for trimming the ends of the article as formed, in a retracted position.

As the web approaches the oven 15, it passes to the upper runs of laterally spaced conveyor chains 16 engaging the edges of the web and retaining the web thereto as by pins 17 (FIG. 6), piercing the edges of the web and serving to carry the web through the oven to and through a former 19. The oven 15 and conveyor chains 16 may be of forms well known to the art so need not herein be shown or described in detail. As schematically shown in FIGS. 1 and 6, the conveyor chains 16 may be conventional roller chains and the pins 17 may have sharpened ends, to project outwardly therefrom to pierce opposite side edges of the web and carry the web along the oven and former, as shown in U.S. Pat. No. 3,830,611, incorporated herein as a part hereof.

The chains 16 of the chain conveyor may pass around idlers 20 at the entering end of said oven and may be partially wrapped around said idlers as by take-ups 21. The web may be pressed to be pierced by the pins 17 as by a pressure roll 23.

Figure 8:
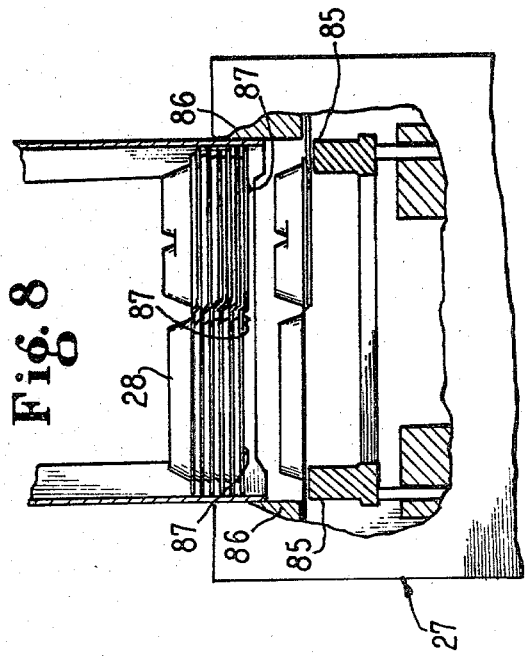
FIG. 8 is a schematic partial transverse sectional view illustrating the trimming of the sides of the formed article and thereby separating the article from the web and then stacking the articles with the leading article forming the top article of the stack.
Figure 3:
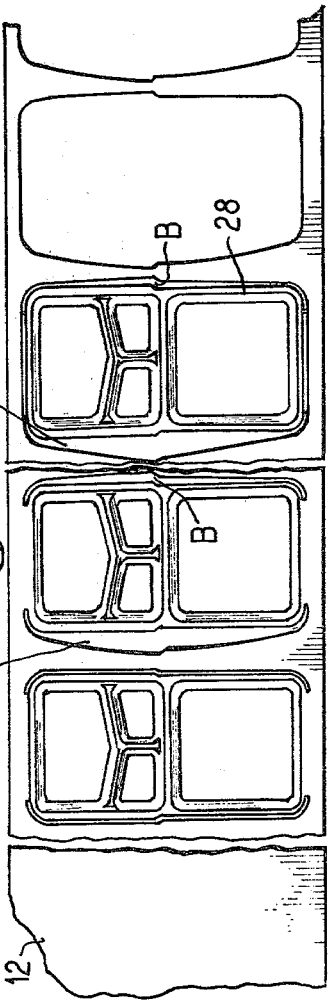
FIG. 3 is a schematic plan view illustrating the formation of a plastic article from a continuous web in accordance with the principles of the present invention.

Drive sprockets 22 in the trim press 27 drive the conveyor chains 16 to carry the web through the oven 15 and the former 19, and trim press 27 where the article is formed as shown in FIG. 3, and the leading and trailing ends of the article are heat-trimmed, and the sides of the articles are trimmed by trim tools in a trim press 27, as will hereinafter more clearly appear as this specification proceeds. The formed and trimmed articles are stacked in the trim press with the leading article forming the top article in the stack, as shown in FIGS. 1 and 8.

The oven 15 may heat the web to a forming temperature, conventionally used in forming by cooled mating heat-conducting molds 29 and 30, as will hereinafter be more clearly described as this specification proceeds.

Figure 2:
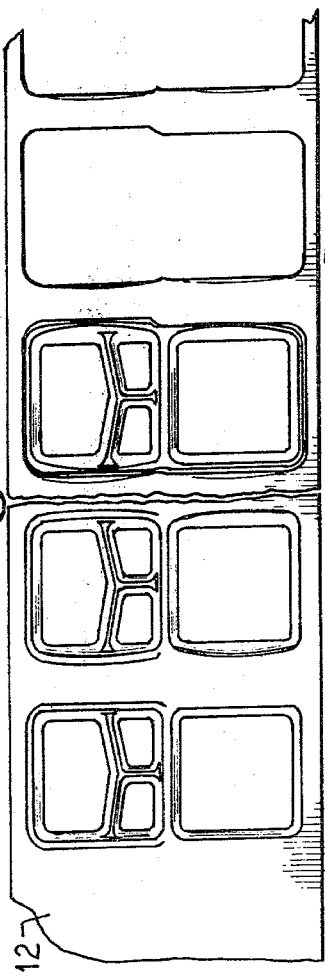
FIG. 2 is a schematic plan view of a prior art web and formed article in which the trailing edge of the article is deformed by the deformation stresses of the heated web still in the oven.

In FIG. 2, I have shown a prior art method of forming food trays 28 or other articles in which the article is formed in a mold and subsequently trimmed in a trim press. In such prior art forming, the article must remain in the mold a relatively long time in order to resist the distortion caused by the stress of the heated web still in the oven upon the articles in the molds. FIG. 2 shows the resulting mis-trimmed article showing the time in the mold to be insufficient to avoid distortion of the article as the mold opens.

In the schematic showing of FIG. 3, the article passing from the oven 15 is formed from a web, heated to a forming temperature, by cooled forming molds, and as the molds close to form the article, the leading and trailing ends of the article are formed by melting or vaporizing, herein termed heat-trimming, and thereby melting the web from the leading and trailing ends of the article and stopping melting by the heat-conductivity of the forming dies. The sides of the article, which are shown in FIG. 3 as being plain or straight are then trimmed in the trim press 27 and removed from the web and stacked with the leading article on top of the stack.

Referring now in particular to the former 19 and certain details of construction thereof, as shown in FIGS. 1, 4, 5, 6 and 7, said former includes cooled forming molds 29 and 30 mounted for movement toward and from each other to close and open the molds. The molds 29 and 30 may be made from a heat-conducting material such as aluminum and are maintained cool by coolant circulated through said molds, as will hereinafter more clearly appear as this specification proceeds.

As previously mentioned, the foam material is heated in the oven to a temperature sufficient to permit forming of the article from a polystyrene foam web into food trays or other articles, which may advantageously be formed from foam material, as known in the art, so not set forth in detail.

Of the plastic materials used in forming plates, cups, food-containing trays and other articles, a polystyrene foam is more commonly used than polyethylene foam or other plastic materials. The material will hereinafter be referred to throughout the specification as a polystyrene foam, although the invention is not intended to be limited to polystyrene foam. The foam further may be of various densities depending upon the use to which the article is to be put. The article also may be laminated with an outer relatively dense lamination of polystyrene foam and an inner lamina of an oriented thermoplastic film, preferably a biaxially oriented polystyrene film. The laminations are not herein shown or described since they form no part of the present invention and are only utilized where a dense surface is required on one side of the film and a less dense or porous surface may be on the other side of the film. A heat-trimmer 33 extends along opposite sides of the dies 29 and 30 to trim opposite ends of the article to the required form, which in the case of a food carrying tray, may be irregular. The heat-trimmer 33 may be heated to the melting or vaporizing temperature of the plastic material and cooperate with the cooled molds 29 and 30, which molds absorb the heat of melting and thereby define the end margins of the foam material. The heat-trimmer 33 is herein shown as being movable independently of the molds 29 or 30, although it may move in unison with either one of said molds.

In order to melt or vaporize the foam material, the heat-trimmers may be heated to a temperature of 800° F. or under, depending upon the type of material to be trimmed, it being understood that the flash point of polystyrene foam is in the order of 926° F. and the heat-trimmers should not be heated to this temperature.

The upper mold 29 is shown as a recessed or female mold having compartments therein generally conforming to the form of a food containing tray and cover. An insert 34 is provided at the juncture between the tray and cover and has an embossment or rib 35 extending therealong to provide a hinge line for the cover, to accommodate the cover to fold over the tray.

The lower or male mold 30 is formed to cooperate with the mold 29 and mate therewith and press the heated web into the upper mold and conform thereto.

The upper mold 29 is shown as secured to a plate 36 having a vacuum passageway 37 leading therefrom and communicating with vacuum passageways 38 and 39 for withdrawing air from the cavities of the mold during the web forming or molding operation and thereby enabling the male mold to uniformly conform the web to the cavities formed in the female mold 29.

Figure 4:
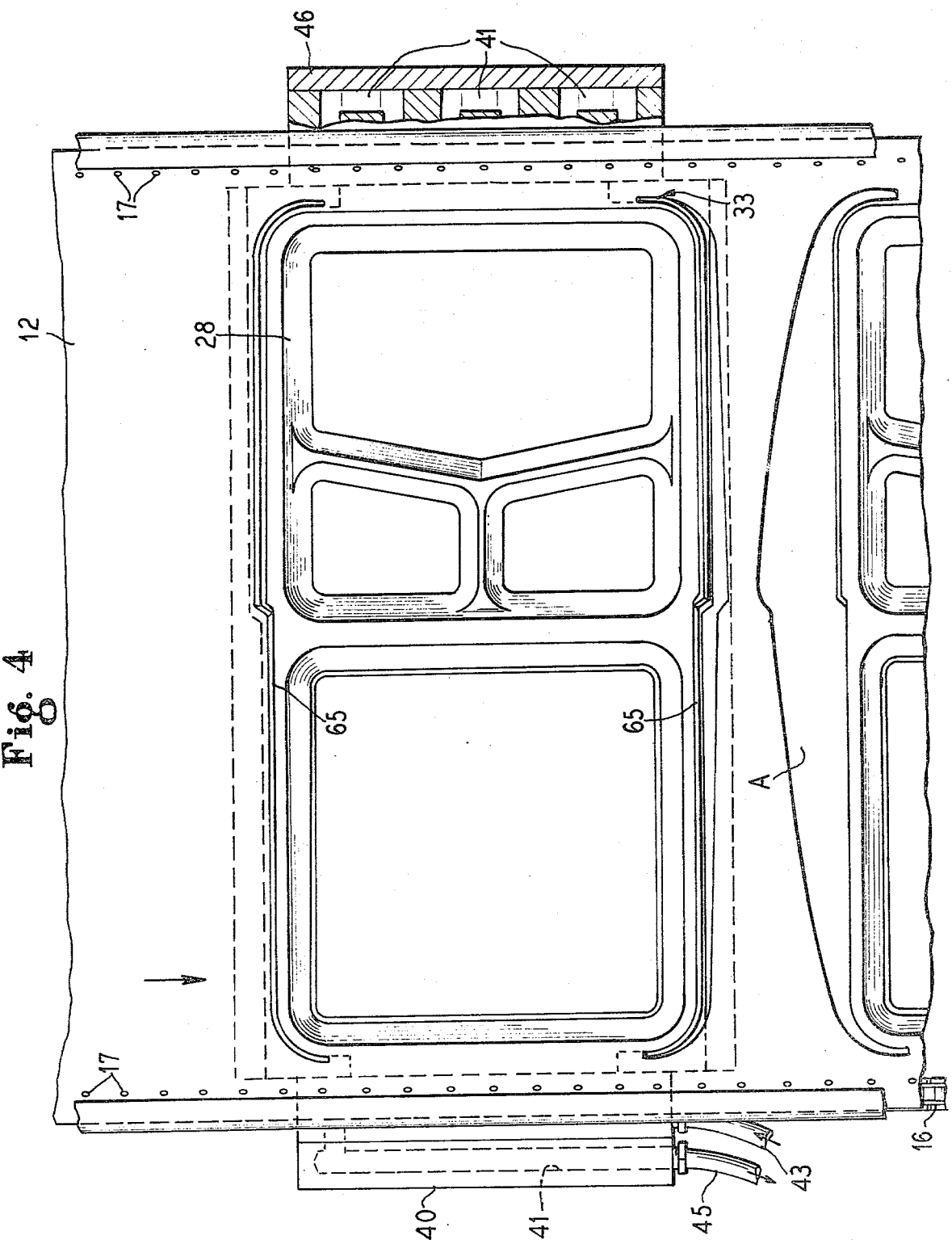
FIG. 4 is a schematic plan view illustrating a form of heat-trimmer which may be used to trim the leading and trailing ends of the article by heating or melting the portion of the article overhanging the molds forming the article, and also showing a trailing end of the article trimmed relative to the thermoplastic foam web from which the article is formed.
Figure 5:
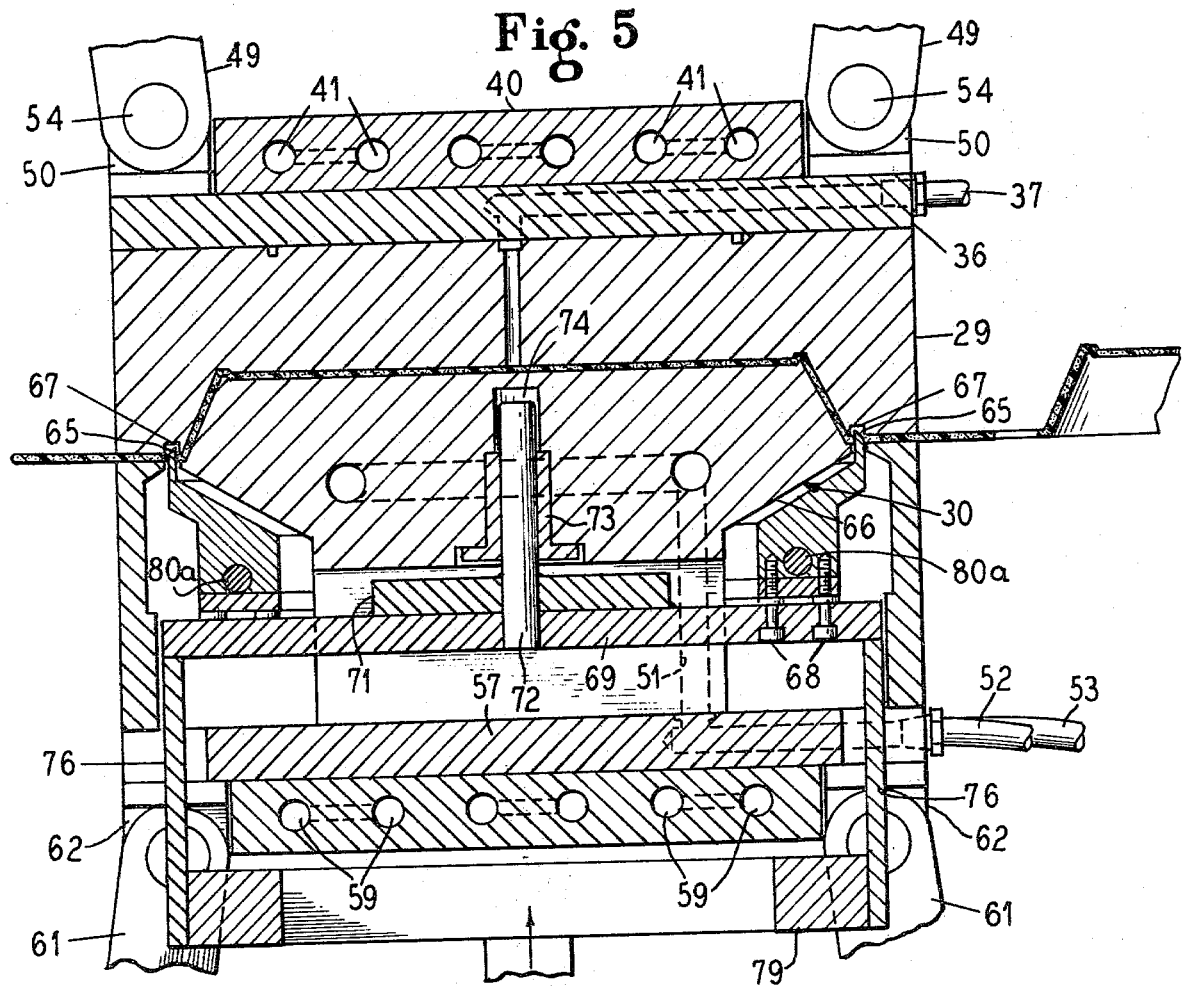
FIG. 5 is a partial fragmentary longitudinal sectional view taken through the forming molds and web and illustrating the heat-trimming of the ends of the article.

The mold 29 is preferably formed from a heat-conducting material such as aluminum, and a plate 36 depends from a cooling plate 40 (FIGS. 4 and 5) having serpentine passageways 41 leading therealong for substantially the length and width of said plate 36, as shown in FIGS. 4 and 5. Coolant enters the passageways 41 through an inlet 43 and leaves said passageways through an outlet 45 (FIG. 4) to maintain the temperature of the mold 29 to a temperature which will absorb the heat of melting of the web by the heat-trimmer 33, trimming the leading and trailing ends of the web and thereby melting or vaporizing the portion of the web extending beyond the molds to conform to the leading and trailing margins of the molds. The serpentine passageways 41 and the cooling plate 40 are shown as closed at one end by a closure plate 46 and at the opposite end thereof, by a closure plate 47, having a passageway 48 leading thereacross and communicating with the serpentine passageways 41 (FIG. 6) to assure the passage of coolant over a substantial portion of the area of the cooling plate 40.

The means for moving the mold 29 to open and close said mold may be of any conventional form, such as toggle links 49 shown in FIG. 6 as bifurcated at their lower ends. The furcations of said links extend along opposite sides of ears 50 projecting upwardly from the top of the plate 36 and are pivoted thereto, as by pivot pins 54. The toggle links may be operated to raise and lower the mold as by a crank mechanism or a cylinder and piston mechanism as is conventional with such molds, to assure a uniform up and down movement of the mold parallel to movement of the male mold 30. Said mechanism need not herein be shown or described since it forms no part of the present invention.

The male mold 30 may be movable relative to the mold 29 or in unison therewith and is also made from a metal of high heat-conductivity, such as aluminum and is cooled by cooling passageways 51, receiving coolant through an inlet 52 and releasing coolant through an outlet 53 to assure that the large bulk of metal of the male mold 30 which is much greater than that of the mold 29 be maintained cool.

A cooling plate 55 extends across the bottom of the male mold 30 and has passageways 56 and 57 leading thereinto and therefrom. The bottom of the cooling plate 55 has a cooling plate 57 like the cooling plate 40 and having serpentine coolant passageways 59 therein. Said passageways serve to circulate coolant along said cooling plate to maintain said cooling plate, the cooling plate 55 and mold 30 to a temperature which will absorb the heat of melting as the web is trimmed by the heat-trimmer 33. Suitable inlet and outlet means (not shown) are provided for admitting and releasing fluid to and from the serpentine passageways 59 and to accommodate the circulation of coolant along said passageways. The mold 30 is moved up and down toward and from the mold 29 by a toggle linkage arrangement 61 like the toggle linkage arrangement 49. Each upper link of the toggle linkage arrangement is bifurcated and pivoted to an ear 62, like the ear 50 and depending from the cooling plate 55. The upper and lower molds 29 and 30 may thus be moved in timed relation toward and from each other to form the portion of the web 12 therebetween to conform to the form of said molds and to open said molds to accommodate the web and partially formed article to pass thereby.

Figure 7:
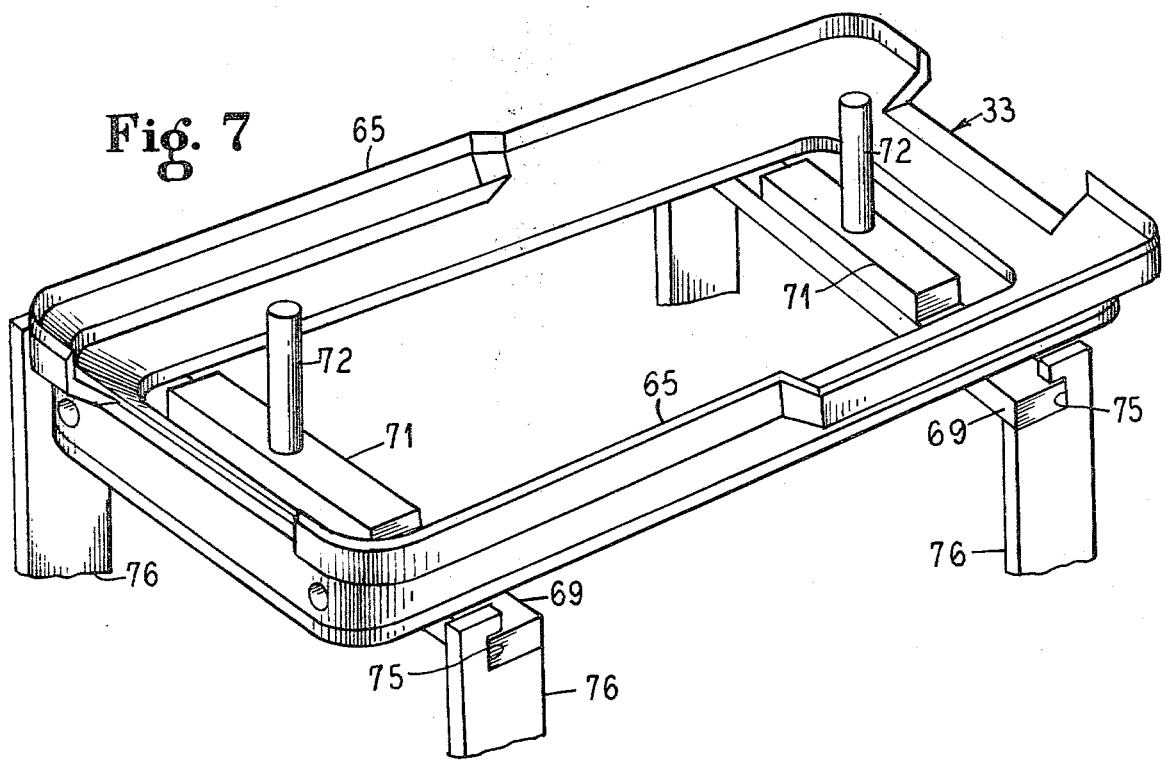
FIG. 7 is a generally perspective view illustrating the heat-trimming knives for trimming opposite ends of the article.

Referring now in particular to the heat-trimmer 33 for heat trim forming opposite ends of the article to the leading and trailing ends of the molds, as illustrated in FIGS. 4, 5 and 7, the heat-trimmer 33 is shown as having opposite heat-trimming edges 65, as shown as being beveled to knife-like trimming edges, although they need not be so beveled. Said heat-trimming edges conform to opposite ends of the article and the irregular portions of the article to be formed, which may be of any desired form, to melt or vaporize the leading and trailing ends of the article and accommodate the cooled heat-conducting molds to absorb the heat of melting.

As shown in FIGS. 5 and 6, the heat-trimmer 33 and forming ends 65 thereof extend vertically of inclined surfaces conforming to downwardly facing inclined surfaces 66 of the male mold and are positioned to extend within grooves 67 in the mold 29, opening toward the web 12, and register with said grooves when the mold is closed. The forming ends 65 clear the grooves 67 on the top and both sides thereof and are out of contact with the cooperating edges of the mold 30 and grooves 67 in the mold 29, to keep the trimming edges out of contact with said mold during the trimming operation. Trimming is thus attained purely by melting or vaporizing the foam material either as the molds are moving toward a closed position and compress the edges of the foam material, or prior to movement of the molds to a closed position. The edges of the molds determine the trimmed margin of the tray rather than the heat-trimmers.

The heat-trimmer assembly is well shown in perspective view in FIG. 7. The trimmer edges 65 may be formed to any desired form the leading and trailing ends of the container are to take and may also be formed to form a locking notch in the tray (not shown) where the article formed is a food tray and the recesses are to form a part of a tab (not shown) adapted to have releasable locking engagement with said notch. Said recesses, notch and tab are not herein shown or described since the tab and notch form no part of the present invention.

Parallel bars 69 extend across the open portion of the heat-trimmer and beyond opposite sides thereof. Said bars 69 are shown in FIG. 7 as having elongated blocks 71 extending along the tops thereof inwardly of the inner margin of the trimmer and welded or otherwise secured to said bars. The bars 69 and blocks 71 form mountings for guide pins 72 having guiding engagement with bushings 73 recessed in the male mold 30. The bushings 73 are flanged and are carried in vertically extending shouldered passageways 74 formed in the bottom of the mold 30, and sufficiently long to accommodate movement of the heat-trimmer 33 relative to said mold.

The parallel bars 69 are shown in FIG. 5 as secured to the bottom of the heat-trimmer assembly as by cap screws 68. The portions of said bars extending beyond opposite margins of said heat-trimmer assembly extend within gibbed recessed portions 75 of the vertical actuator bars 76.

As shown in FIG. 5, the vertical actuator bars 76 extend upwardly of an actuating member 79, which may be a plate. Said actuating member has a drilled and threaded central portion for receiving a piston rod 78, which may extend from a cylinder (not shown). The admission of fluid under pressure to one end of said cylinder will thus move the heat-trimmer assembly toward the web and through the web into the groove 67, to effect trimming of the leading and trailing ends of the article by heat, independently of closing movement of the molds 29 and 30, which compress or pressurize the edges trimmed and terminate the trimming operation by absorbing the heat of trimming.

The heat-trimmer has heating elements 80a extending along each side thereof, which may be in the form of coils or may be cal-rod heaters and energized through electrical connectors 81a (FIG. 6) connected to a source of electric power. The heat-trimmer 33 is thus heated to the melting or vaporizing temperature of the thermoplastic material, which may vary depending upon the density and type of foam material to be trimmed, in order to maintain the trimming edges 65 to the melting or vaporizing temperature of the thermoplastic foam material as formed.

Buffer means are shown as provided between the insert 34 and cooling plate 55, which includes a cylindrical passageway 80 in alignment with the reduced end of the insert 34. A pin 81 is slidably guided in said passageway and has a buffer block 82 at one end and a head 83 at its opposite end, abutting a block 84 recessed in the cooling plate 55 (FIG. 6).

Thus far, I have described the apparatus and molds for forming the thermoplastic web to the required form and for heat-trimming the leading and trailing ends of the web, which may be irregular in form. At the termination of this operation, the leading and trailing ends of the formed article have been severed from the web and a relatively large opening A is formed in the web at the trailing end of the article while a smaller opening B is formed along the leading trimmed end of the article. This relieves the web from tension and prevents distortion of the web and article as removed from the molds and heat-trimmer and enables the web to carry the article along the sides of the article to the trim press 27.

The trim press 27 may be of a conventional form so need not be shown and described in detail and includes cooperating trim tools 85 and 86, which may be straight and diagrammatically shown as being of a block-like form, although they need not necessarily be straight and of such a form, but each trim tool should be regular and cooperate with the other to trim the article from the web along each side thereof and connect the opposite sides of the trimmed leading and trailing ends of the article together to form a completed article, shown in the drawings as the compartmented food carrying tray 28 having a hinged lid, which may be locked in position by cooperating locking tabs and latch openings (not shown) in a conventional manner and not herein described since they form no part of the present invention.

The food trays as trimmed from the web are shown in FIG. 8 as opening in a downward direction and as moved upwardly past spring fingers 87 by the support for the trim tools 85, as said tools move upwardly along the trim tools 86 and eject the formed article from the web and move the article out of the path of the oncoming food trays past the spring retainer fingers 87. The trim tools 85 may be vertically moved by fluid pressure means (not shown) or any other suitable rectilinear motion producing means to effect trimming of the sides of the article from the portion of the web holding the article to the web, and then ejecting the article from the web to be engaged by the spring retainer fingers 87, during dwells in advance of the web. The rectilinear motion producing means for vertically moving the trim tools 85 may be of any conventional form, commonly used in conventional trim presses so not herein shown or described further.

The leading and trailing ends of the article, which may be irregular, and opposite sides of the article which may be straight or regular need not be aligned for the final trimming and ejecting operation, and the food trays may readily be stacked with the leading article formed on top and the trailing articles stacked thereunder.

It is, of course, understood that the conveyor 16 is intermittently driven to advance the web between the cooperating molds 29 and 30, and has a dwell during the forming and heat-trimming operations, and during trimming of the sides in the trim press, and then advances the web for a next forming and heat-trimming operation, and that the completed trays or other articles formed are ejected from the web during each dwell, to effect a continuous process for uniformly forming and stacking the articles, which may continue as long as there is a thermoplastic foam web 12 on the reel 11. The web, as leaving the trim press, may be fed between pinch rolls 97 to scrap, where it may be reprocessed and reused.

I claim as my invention:

1. A process of forming a foam thermoplastic article from a web of foam thermoplastic material comprising the steps of:

intermittently advancing a foam thermoplastic web through an oven, heating the web to a forming temperature while advancing through the oven, entrapping a portion of the web between heat-absorbing male and female molds and thereby forming the article to the form of said molds, providing a heat-trimmer along the leading and trailing ends of at least one mold and heating the heat trimmer to the melting temperature of the foam thermoplastic material, heat-trimming the article along the leading and trailing ends thereof by melting substantially contemporaneously with the forming of the article by said molds by advancing the heat-trimmer to the web along the leading and trailing ends of the article and melting or vaporizing the leading and trailing ends of the article and defining the margins of the trimming operation by absorbing the heat of melting by said molds, retaining the formed article to the web along the side margins of the web, separating the molds and advancing the web and article to a trimming station, and trimming the article from the web along the side margins of the article by trim tools at the trim station.

2. The process of claim 1, including the steps of cooling the molds and heating the heat-trimmers adjacent opposite ends of the molds to a temperature in the order of 800° F.

3. The process of claim 1, including the steps of stacking the separated formed articles as trimmed by exerting vertical pressure on each trimmed article from beneath the trimmed article with the leading article forming the top of the stack.

4. A process of forming a thermoplastic foam article comprising the steps of:

providing a web of thermoplastic foam material, providing conveyors engaging each side margin of the web and intermittently advancing the web through a heated oven, heating the web to a forming temperature as passing through the oven, advancing the heated portion of the web to a forming station, providing opposed cooperating male and female molds at said forming station and chilling said molds, providing at least one heat-trimmer at said forming station adjacent at least one of the leading and trailing ends of at least one of said molds, heating said heat-trimmer to the melting or vaporizing temperature of the foam material, moving said molds toward one another during a dwell in travel of the web, entrapping said web between said molds and forming said thermoplastic article to form by pressure as said molds move toward each other, moving said heat-trimmer towards said web with at least one of said molds and melting or vaporizing said web by said heat-trimmer, adjacent at least one of the leading and trailing ends of one of said molds, and thereby separating the leading and trailing ends of formed article from the web across the width of the web and retaining the formed article to the web at the side edges thereof, moving at least one of the molds and heat-trimmer away from the web and formed article, advancing the web and formed article to a trimming station, and trimming the side edges of the formed article from the web along uniform lines along the side edges of the article.

5. The process of claim 4, including the step of terminating melting or vaporization of the web material at the leading and trailing edges of the molds by absorbing the heat of melting or vaporization by said cooled molds as the material is pressurized during formation of the web.

6. The process of claim 4, wherein the trimming of the side edges of the formed article is by movement of substantially parallel spaced-apart trim tools into contact with the web at the opposite side edges of the articles, and wherein the trim tools extend from the heat-trimmed portion of the web and terminate at least adjacent the leading and trailing ends of the formed article.

7. The process of claim 6, wherein the at least one heat-trimmer is provided adjacent the leading and trailing ends of the molds and effects the separation of the formed article from the web at both the leading and trailing ends of the formed article, during formation thereof.

8. The process of claim 7, including the step of providing a trimmer tool receiving groove in the mold opposite the said one of said molds adjacent the periphery thereof, and moving the heat-trimmer through said web into said groove as the pressure of said molds forms the foam article.

9. The process of claim 8, wherein the heat-trimmer and groove move toward one another in unison with movement of the moldes to their closed position.

* * * * *